ered. Forward or reverse output rotation is selected by moving a control button positioned on the periphery of the reversing mechanism. Speed reduction in the range from 3 to 5 to 1 can be achieved by this mechanism.

United States Patent [19]
Ciolli

[11] 4,255,987
[45] Mar. 17, 1981

[54] REVERSIBLE SPEED REDUCTION MECHANISM

[75] Inventor: Donald A. Ciolli, University Heights, Ohio

[73] Assignee: Rotor Tool Company, Cleveland, Ohio

[21] Appl. No.: 904,610

[22] Filed: May 10, 1978

[51] Int. Cl.$^3$ .......................... F16H 5/10; F16H 57/10
[52] U.S. Cl. ........................................ 74/768; 74/788
[58] Field of Search ................ 74/785, 788, 768, 810, 74/812, 769

[56] References Cited
U.S. PATENT DOCUMENTS

| | | | |
|---|---|---|---|
| 393,310 | 11/1888 | Miller | 74/788 X |
| 740,128 | 9/1903 | Harvey | 74/788 |
| 1,009,954 | 11/1911 | DeBriones | 74/788 X |
| 1,027,313 | 5/1912 | Bozarth | 74/788 |
| 1,239,252 | 9/1917 | Baukat | 74/788 |
| 2,618,175 | 11/1952 | Bruce | 74/768 |
| 2,682,789 | 7/1954 | Ochtman | 74/768 |
| 2,748,623 | 6/1956 | Hill | 74/768 |
| 2,862,406 | 12/1958 | Howell | 74/768 |
| 2,935,900 | 5/1960 | Rabinow et al. | 74/788 |
| 3,136,180 | 6/1964 | Sprague et al. | 74/768 |
| 3,165,974 | 1/1965 | Smith | 74/788 X |
| 3,217,564 | 11/1965 | Smith | 74/788 X |
| 3,217,565 | 11/1965 | Dietrich | 74/768 |
| 4,114,477 | 9/1978 | Iverson | 74/768 |

Primary Examiner—C. J. Husar
Assistant Examiner—Philip W. Thor
Attorney, Agent, or Firm—Wilson, Fraser, Barker & Clemens

[57] ABSTRACT

A reversible speed reducing mechanism for use with hand-held power tools comprises a pair of juxtaposed epicyclic gear trains mounted in a common carrier which independently engage a pair of cages or ring gears. The cages may alternately be locked to or released from an outer housing to accomplish the bidirectional transmission of rotational power. The complete reversing mechanism is housed in a generally cylindrical body suitable for mounting between a conventional unidirectional motor and gear head or powered device. Forward or reverse output rotation is selected by moving a control button positioned on the periphery of the reversing mechanism. Speed reduction in the range from 3 to 5 to 1 can be achieved by this mechanism.

9 Claims, 5 Drawing Figures

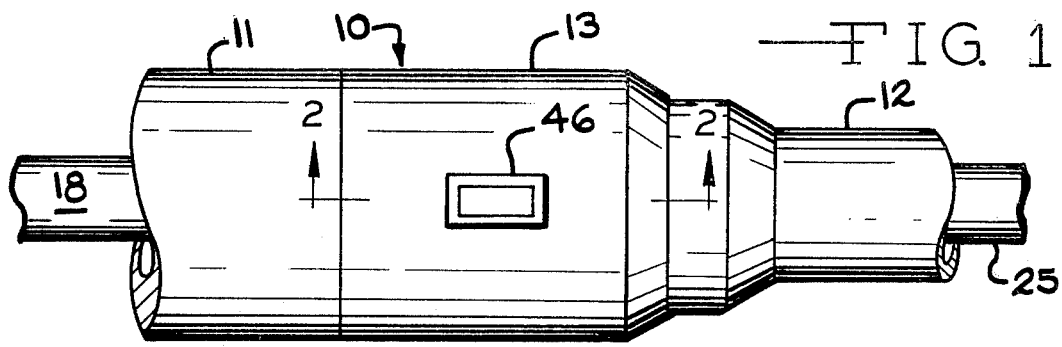
FIG. 1
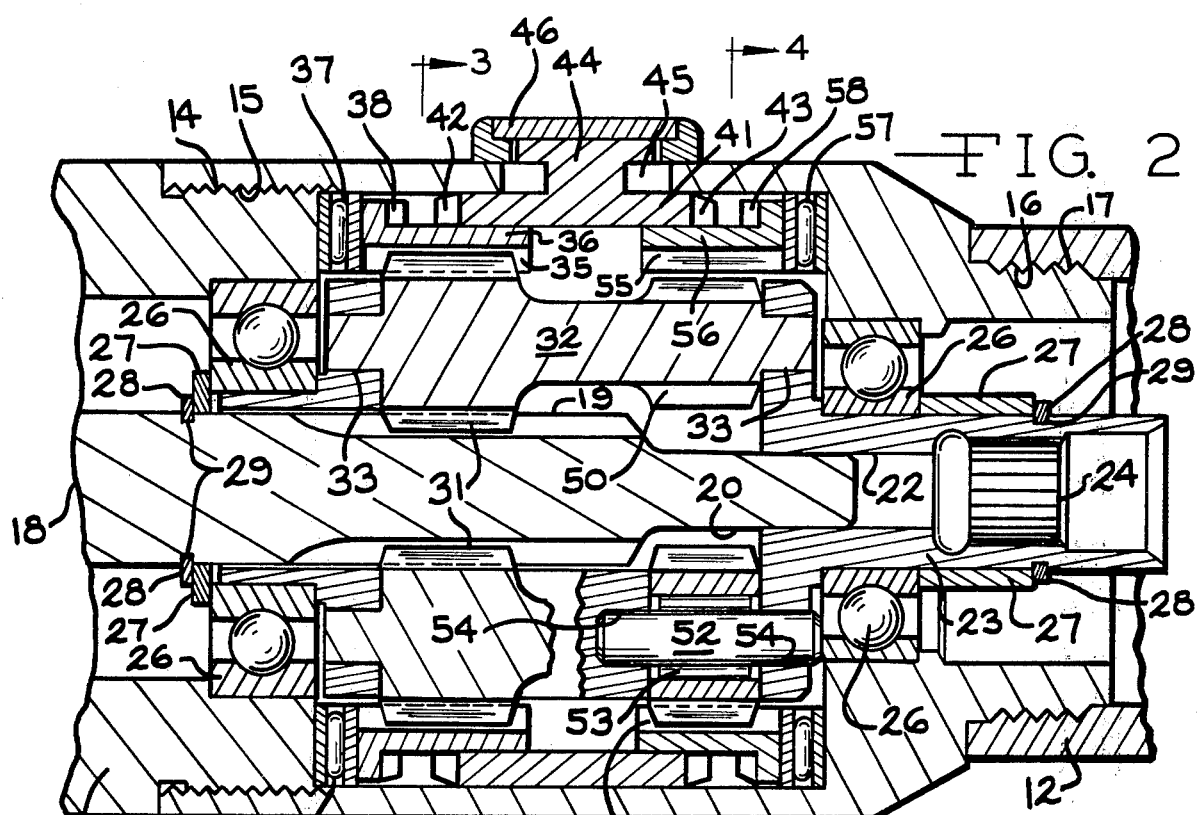
FIG. 2
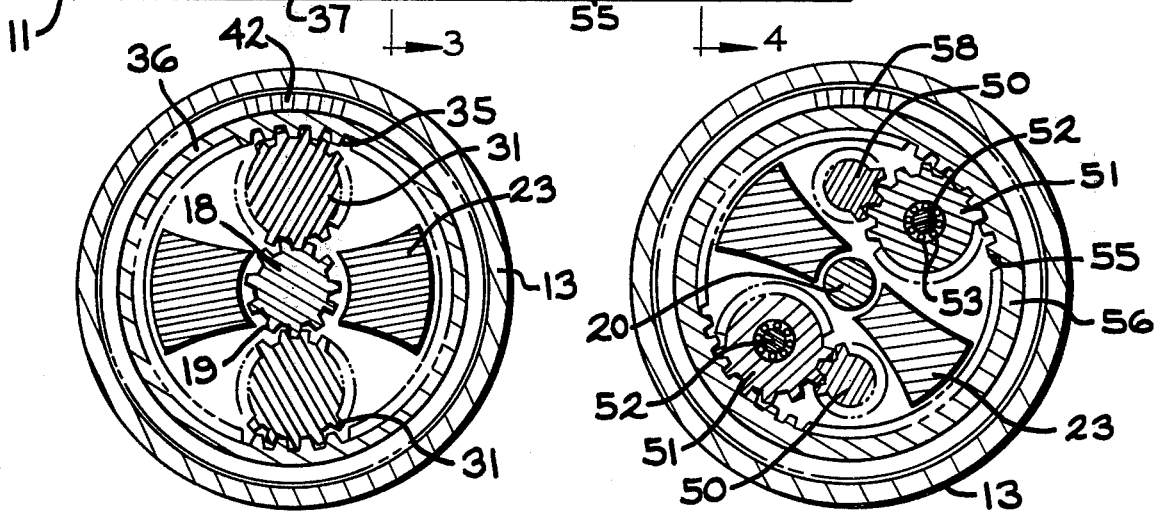
FIG. 3
FIG. 4

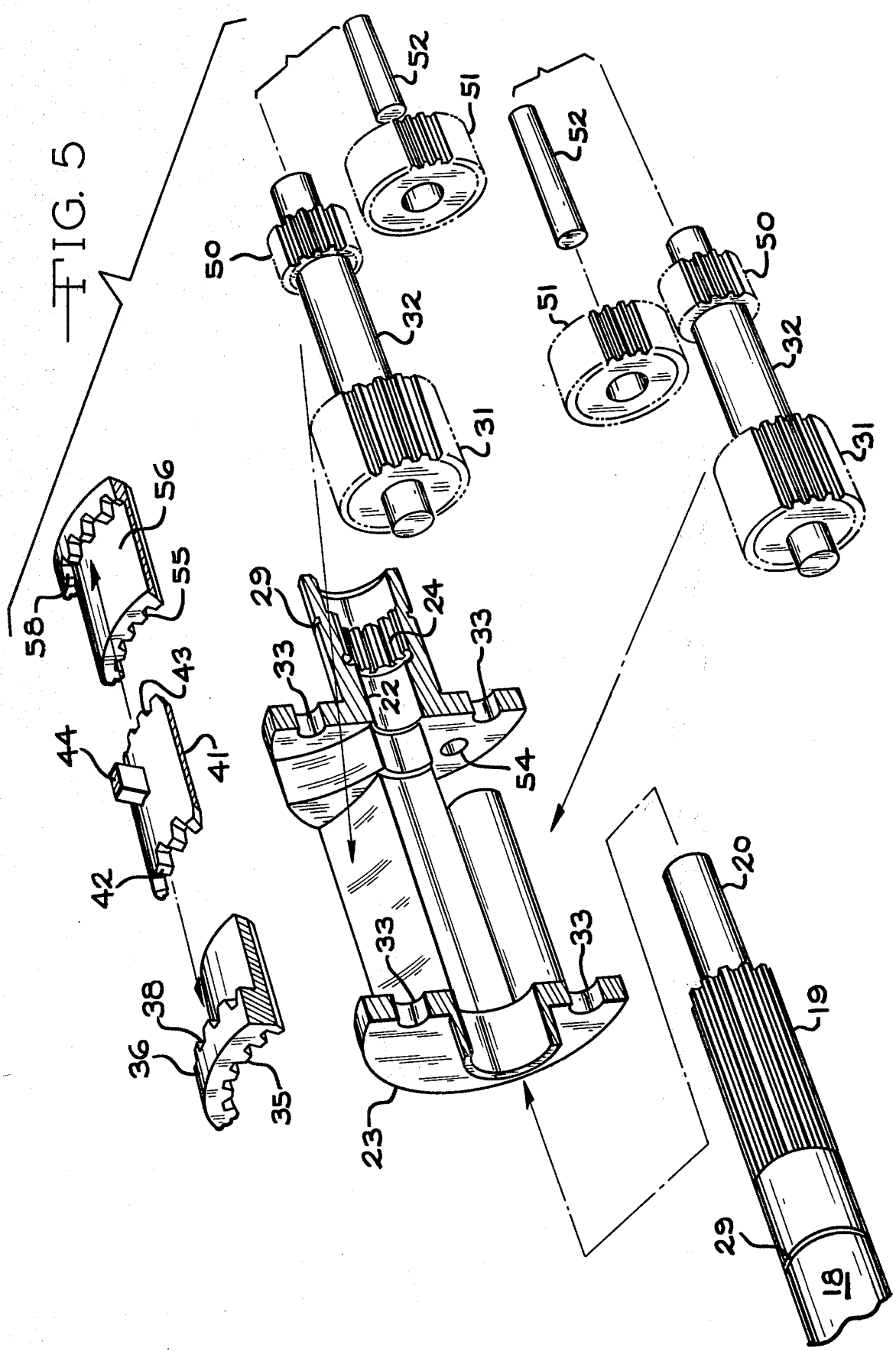

REVERSIBLE SPEED REDUCTION MECHANISM

BACKGROUND OF THE INVENTION

The invention relates to a reversible speed reducing mechanism for use with hand-held power tools and more particularly to a reversing mechanism for use with power production line tools having a separable motor and gear head which also provides a reduction in speed of three to one to five to one and a concomitant proportional increase in output torque.

Increasing dependence upon the production line method of manufacturing has created an equal dependence upon lightweight hand-held power tools for use by assembly personnel in the manufacturing process. The vast majority of these tools are powered by either compressed air or electricity. Various devices such as gear trains, ratchet mechanisms and impulse devices may be attached to relatively simple high r.p.m. motors to provide energy in the particular form required by a given assembly operation.

One of the most common requirements of such power tools is the ability to reverse the direction of drive in order to facilitate the removal of a threaded fastener which may have been improperly inserted or which must be removed in order to disassemble other components.

In electrically powered tools, directional control is a deceptive problem. It is well known that simply reversing the polarity of electricity to certain windings of the motor will effect directional control and that this can be accomplished by conventional switching means. However, it is seldom appreciated that the rotational speeds of such motors may be as high as 15,000 R.P.M. and that the sudden reversal of motor rotation subjects the driven elements of a tool to severe mechanical shock which materially shortens its life. Secondly, the current surge and back EMF associated with the reversing of the motor necessitates an exceedingly heavy duty reversing switch. Unfortunately, a switch exhibiting the necessary durability is generally bulky and oftentimes fatiguing to the tool operator due to its high activation force.

In the case of the air powered motors, the means most commonly relied upon to provide bidirectional rotation is a vane motor having two inlet ports symmetrically disposed in opposite halves of the vane motor chamber and a common exhaust port positioned midway between the ports. Air entering one inlet port and exiting through the common exhaust port causes the air motor to rotate in one direction whereas air entering the other inlet port and exiting the common exhaust port causes rotation of the motor in the opposite direction. This type of reversing air motor has one drawback. Since the air must enter and exit the vane motor in somwhat less than 180 degrees, the expansive force and thus the power produced by the air motor is less than that which can be produced in a conventional unidirectional motor wherein the radial separation of the inlet and outlet ports allows the effective utilization of the expansive power of the air over approximately 240 degrees. Thus, if the output of an air motor must be bidirectional, a certain amount of output power must be compromised to accomplish it.

The alternative to utilizing a bidirectional air or electric motor in a hand-held tool is incorporating a separate reversing mechanism into a tool having a unidirectional motor. Generally, these devices exhibit lower power output than a unidirectional tool. In this case, the power loss is due to the additional gearing in the reversing mechanism. Such reversing mechanisms also generally add substantially to the weight of the hand-held power tool. In production line work, where an operator may lift and move the tool continuously for several hours, any additional weight markedly increases operator fatigue. Furthermore, the size of the tool is also an important consideration since it is often necessary to operate the tool within the structure being assembled, such as an automobile. A bulky tool which includes the reversing capability required in an application, may, however, be unusuable because it cannot engage or cannot easily be manipulated to engage the fastener or other device it is intended to assemble due to the confined space within which it must function.

If a production process requires slow rotation, the necessary mechanism may be even more complex. Gearing in addition to that necessary to produce bidirectional output rotation may be required and the size and weight of the reversing mechanism may then increase to a point where the tool is intractable for production line use.

SUMMARY OF THE INVENTION

The invention comprises a reversible speed reducing mechanism for use with power hand tools having a pair of juxtaposed epicyclic gear trains mounted in a carrier which independently engage a pair of cages or ring gears. The cages may be selectively locked to or released from an outer housing to effect the bidirectional output of the air powered tool. A reduction ratio in the range from 3 to 5 to 1 which may be different in the forward and reverse directions slows the rotational speed of the driving motor while effecting an increase in the torque. The reversing mechanism is contained in a generally cylindrical housing having a diameter approximately equal to that of the motor to which it is assembled and it includes a control button which may be moved to the front of or the rear of the cylindrical housing by the operator to select the direction of rotation of the output.

In the forward or speed reduction only mode of operation, the first cage is locked to the outer housing and the second cage is free to rotate. The first epicyclic gear train is driven from the input shaft and revolves within the first cage. The carrier in which the first epicyclic gear train is mounted is connected directly to the output shaft which transfers rotational power out of the mechanism. Operating in the reverse, speed reducing mode, the second cage is locked to the housng and the first cage is free to rotate. The second epicyclic gear train comprises two pairs of meshing gears one of each pair being indirectly driven by the input shaft, the second of each pair of gears engaging with the locked cage. The second epicyclic gear train thus revolves in the reverse direction of the input shaft and causes a like reverse rotation of the carrier and output shaft.

It is thus an object of this invention to provide a reversible speed reduction mechanism for use with power hand tools.

It is a further object of this invention to provide such a reversible speed reduction mechanism which can be retrofit to existing power hand tools separable between the motor and drive head.

It is a still further object of this invention to provide such a mechanism in a compact, lightweight device which does not add appreciably to the weight and size of the power tool.

It is a still further object of this invention to provide such a reversible speed reduction mechanism having a control structure which is easily and positively operable.

It is a still further object of this invention to provide a reversible speed reducing mechanism incorporating both equal and unequal forward and reverse gear reduction ratios.

BRIEF DESCRIPTION OF THE DRAWINGS

FIG. 1 is a top plan view of a speed reducing mechanism according to the instant invention in place on a power hand tool;

FIG. 2 is a full sectional side elevational view of a reversible speed reduction mechanism according to the instant invention, taken along line 2—2 of FIG. 1;

FIG. 3 is a full sectional end elevational view of a reversible speed reduction mechanism according to the instant invention taken along line 3—3 of FIG. 2;

FIG. 4 is a full sectional end elevational view of a reversible speed reduction mechanism according to the instant invention taken along line 4—4 of FIG. 2; and FIG. 5 is an exploded perspective view in partial section of the components of a reversible speed reduction mechanism according to the instant invention.

DESCRIPTION OF THE PREFERRED EMBODIMENT

Referring now to FIG. 1, a reversible speed reduction mechanism according to the instant invention is generally designated by the reference numeral 10. The mechanism 10 is intended to be positioned between a motor housing 11 and an output head 12 of a conventional power tool. The mechanism 10 is wholly contained within a cylindrical housing 13.

Referring now to FIG. 2, the mounting between the motor housing 11 and the output head 12 is facilitated by female threads 14 and male threads 16 on the reversing mechanism housing 13 which mate with matching male threads 15 and female threads 17 on the housing 11 and head 12, respectively. An input shaft 18 transfers power from the motor into the mechanism 10. The input shaft 18 includes gear teeth 19 along a portion of its length and narrows near its terminus to a reduced diameter portion 20. The reduced diameter portion 20 seats within an axial bearing opening 22 which is formed within a gear carrier 23. The gear carrier 23 is disposed concentrically about the input shaft 18 and further includes a splined portion 24 which is engageable by a mating splined surface (not shown) on an output shaft 25 illustrated in FIG. 1. The input shaft 18 and the gear carrier 23 are rotatably positioned within the housing 13 and maintained in coaxial alignment by two anti-friction bearings 26. The anti-friction bearings 26 may be ball bearings or other suitable means. The input shaft 18, the gear carrier 23 and the anti-friction bearings 26 are maintained in proper relative longitudinal alignment within the housing 13 by spacers 27 and retainer rings 28. The rings 28 are seated in circumferential channels 29 in the input shaft 18 and the gear carrier 23.

Referring now to FIGS. 2 and 3, the reversing mechanism 10 is seen to include a first set of epicyclic or idler gears 31. Each of the idler gears 31 is secured to a shaft structure 32 which is mounted in pairs of openings 33 in the carrier 23 on axes parallel to the drive shaft 18. As seen in FIG. 3, the idler gears 31 mesh with the gear teeth 19 on the input shaft 18 and gear teeth 35 on the inner surface of a circumferential planetary gear cage 36. The gear cage 36 is positioned concentrically within the housing 13 and axially bears against an annular thrust bearing assembly 37. The cage 36 also includes a plurality of radially disposed teeth 38 on an outwardly projecting surface adjacent the thrust bearing assembly 37. The profile of the teeth 38 may be any one of a number of conventional gear profiles subject to the usual compromise of smooth engagement versus minimization of resolved axial forces which tend to disengage such teeth.

Referring again to FIG. 2, the mechanism 10 can also be seen to include a rotation inhibiting brake annulus 41 concentrically disposed within the housing 13. The brake annulus 14 contains a plurality of teeth 42 on its face adjacent teeth 38 which are of similar profile and mate therewith. Likewise, the opposite face of brake annulus 41 includes a plurality of teeth 43. The brake annulus 41 further includes a radially extending projection 44 which passes through an opening 45 in the housing 13 and is fitted with a control knob or button 46 which is manually positionable in a forward or reverse position by the tool operator.

Referring now to FIGS. 2 and 4, the shaft structures 32 upon which the first pair of idler gears 31 are mounted extend axially forward within the housing 13 and mount a second pair of idler gears 50. The idler gears 50 represent one half of the second epicyclic gear trains which also contain a third pair of idler gears 51. Each of the idler gears 51 is positioned on a stub shaft 52 and an anti-friction bearing 53 between the idler gears 51 and the stub shafts 52 minimizes friction between these components. The stub shafts 52 are mounted in pairs of aligned openings 54 in the carrier 23. The idler gears 51 engage the idler gears 50 and gear teeth 55 in a second gear cage 56. The gear cage 56 is positioned concentrically within the housing 13 and is coaxial with the input shaft 18. An anti-friction assembly 57 is disposed between an axial end of the cage 56 and the shoulder section of the housing 13. The cage 56 further includes a plurality of radially disposed teeth 58 on an outwardly projecting surface of the cage 56. The teeth 58 are engageable with the teeth 43 disposed on the adjacent radial surface of the brake annulus 41.

Referring now to FIG. 5, the spacial positioning of the elements of the reversing mechanism can be clearly seen. Note that the input shaft 18 including the gear teeth 19 and reduced diameter portion 20 mounts from the left end of the carrier 23 and seats in the opening 22. Likewise, the idlers 31 on the shaft structure 32 are seated in the carrier 23 between the input shaft gear teeth 19 and the gear teeth 35 on the inner surface of the gear cage 36. The second set of epicyclic gears includes the idler gears 50 and the idler gears 51 which are positioned within the carrier 23. The idlers 51 are positioned on the stub shafts 52 and mesh with the idlers 50 and the gear teeth 55 on the inner surface of the cage 56. The teeth 42 and 43 on the brake annulus 41 selectively engage and disengage the mating teeth 38 and 58 on the cages 36 and 56, respectively.

The operation of the mechanism 10 can best be understood by reference to FIGS. 2 and 5. In the forward or speed reduction only mode of operation, the brake annulus 41 is moved to the left as shown in FIGS. 2 and 5. The cage 36 is thus locked in the housing 13 while the second cage 56 is free to rotate. The gear teeth 19 on the input shaft 18 drive the idler gears 31 which rotate in the opposite direction. The idlers 31, however, must rotate against the gear teeth 35 on the inner surface of the locked cage 36 and thus they compel the carrier 23 to rotate in the same direction as the input shaft 18 but at a reduced speed.

Operation in the reverse speed reduction mode is similar. The brake annulus 41 is moved to the right as illustrated in FIG. 2, unlocking the cage 36 and locking the cage 56 to the housing 13. Rotary motion is imparted to the shaft structure 32 through the idler gears 31 from the gear teeth 19 on the input shaft 18. The intermediate idlers 50 transfer power to the second idlers 51 which are in engagement with the gear teeth 55 on the inner surface of the cage 56. Since the idlers 51 engage the cage 56 in a fashion similar to the engagement of the idlers 31 in the cage 36 but are rotating in the opposite direction from that of idlers 31, the carrier 23 will be compelled to rotate in the opposite direction from the forward (speed reduction only) mode of operation. Again, since the output of the mechanism 10 is derived from the carrier 23, it is apparent that a reduction in rotational speed as well as a directional change will be accomplished.

Regarding the range of reduction rates, various gear teeth combinations can be incorporated into the reversing mechanism to produce reduction ratios over the range of approximately 3 to 5 to 1. For example, the cages 36 and 56 may incorporate 42 gear teeth on their inner surface; the gear teeth 19 on the input shaft 18 may be 12 in number; the idlers 31 may have 15 teeth; the idlers 50 may have 9 teeth; and the idlers 51 may have 12 teeth. In the forward mode of operation this combination of gearing results in a speed reduction of 4.5 to 1. In the reverse mode of operation a 4.833 to 1 speed reduction is effected. Thus it is apparent that the forward and reverse gear reduction ratios need not be equal.

As a second example, the number of gear teeth on the idler gears 31 may be increased to 14 while utilizing the same number of gear teeth on all other elements. This results in the same forward speed reduction of 4.5 to 1 whereas the speed reduction in the reverse operating mode will be 4.444 to 1. As previously stated, various combinations of gear teeth and various idlers will produce reduction ratios in the range of from 3 to 1 to 5 to 1.

The foregoing description is the best mode devised by the inventor for practicing this invention. However, the invention should not be construed to be limited by the foregoing description. It is apparent that various other embodiments incorporating modifications and variations will be obvious to one skilled in the art to which the invention pertains. Such obvious variations are hereby included and the invention limited solely by the spirit and scope of the following claims.

What I claim is:

1. A reversible speed reduction mechanism for use with power tools comprising an input shaft having gear teeth, a carrier concentrically disposed about said input shaft and defining an output structure, a housing disposed about said shaft and said carrier, bearing means for rotatably mounting said shaft and said carrier within said housing, a first gear cage disposed concentrically about said input shaft gear teeth, a first pair of idler gears each mounted for rotation about an axis in said carrier in meshed engagement with said input shaft gear teeth and said first gear cage, a second pair of idler gears each mounted for rotation about one of said axes and connected to one of said first idler gears for rotation therewith, a second gear cage disposed concentrically about said carrier, a third pair of idler gears in meshed engagement with said second pair of idler gears and said second gear cage, brake means for selectively coupling said first cage to said housing in a first position and coupling said second cage to said housing in a second position, said brake means comprising an axially translatable annulus having means disposed about its ends for selectively, alternately engaging and releasing said first and said second gear cages whereby the rotational direction of said output structure may be selected by the selective alternate locking and releasing of said gear cages.

2. The reversing mechanism of claim 1, further including an axial thrust bearing disposed between said housing and each of said gear cages.

3. The reversing mechanism of claim 1, further including a structure positioned on the outer surface of said housing and operably connected to said brake means.

4. The reversing mechanism of claim 1, wherein said annulus includes means for precluding relative rotation between said annulus and said housing and wherein said engaging means comprises teeth.

5. The reversing mechanism of claim 1, wherein said input shaft and said output structure are coaxially aligned.

6. A reversible speed reduction mechanism for use with power tools comprising an input shaft having gear teeth, a gear carrier disposed concentrically about said input shaft and defining an output structure, a housing disposed about said shaft and said carrier, means for rotatably mounting said shaft and said carrier within said housing, a first gear cage disposed concentrically about said input shaft gear teeth, a first pair of idler gears rotatably mounted within said carrier in meshed engagement with said input shaft gear teeth and said first gear cage, a second pair of idler gears axially disposed from and connected to said first idler gears for rotation therewith, a second gear cage disposed concentrically about said gear carrier, a third pair of idler gears in meshed engagement with said second pair of idler gears and said second gear cage, and brake means for selectively coupling said first cage to said housing in a first position and coupling said second cage to said housing in a second position, said brake means comprising an axially translatable annulus having means disposed on its ends for selectively and alternately engaging and releasing said first and said second gear cages, and means external to said housing for translating said annulus between said first and said second positions, whereby the rotational direction of said output structure relative to said input shaft may be selected by the selective positioning of said external means and said annulus.

7. A reversible speed reduction mechanism comprising, in combination, an input gear, a gear carrier disposed about said input gear and defining an output structure, a housing disposed about said gear carrier, a first gear cage disposed concentrically about said input gear, at least two first idler gears rotatably mounted in said gear carrier in meshed engagement with said input gear and said first gear cage, at least two second idler gears rotatably mounted in said gear carrier and coupled to a respective one of said first idler gears, a second gear cage disposed in coaxial alignment with said first gear cage, at least two third idler gears rotatably mounted in said gear carrier in meshed engagement with a respective one of said second idler gears and said second gear cage, brake means for selectively inhibiting relative rotation between said first cage and said housing in a first position and inhibiting relative rotation between said second cage and said housing in a second position, said brake means including an axially translatable annulus having means disposed at each end for engaging said first and said second gear cages and means disposed on the exterior of said housing and operably coupled to said annulus for facilitating positioning of said annulus in said first and said second positions.

8. The reversing mechanism of claim 7 wherein said first and said second gear cages include means complementary to said engaging means disposed on said annulus for assisting engagement therebetween.

9. The reversing mechanism of claim 8 wherein said engaging means and said complementary means comprise face gear teeth.

* * * * *